United States Patent [19]

Conner et al.

[11] Patent Number: 4,898,365

[45] Date of Patent: Feb. 6, 1990

[54] MODULAR BARRIER

[75] Inventors: John P. Conner, Grandville; James R. Bouse, Belmont, both of Mich.

[73] Assignee: Allied Tube & Conduit Corporation, Harvey, Ill.

[21] Appl. No.: 87,414

[22] Filed: Aug. 20, 1987

[51] Int. Cl.[4] .............................................. E04H 7/14
[52] U.S. Cl. .................................... 256/65; 256/22; 403/263
[58] Field of Search ............... 256/59, 65, 67, 68, 256/66, 69, 70, 22, 21, DIG. 6; 403/240, 263, 230, 239, 238, 243, 225, 226, 254, 195, 194, 252; 16/2; 24/142, 141

[56] References Cited

U.S. PATENT DOCUMENTS

| | | |
|---|---|---|
| 1,416,957 | 5/1922 | Hughes . |
| 1,791,680 | 2/1931 | Miller . |
| 2,557,002 | 6/1951 | Lathrop ........................ 256/65 |
| 2,654,579 | 10/1953 | Cremens ........................ 256/21 |
| 2,698,775 | 1/1955 | Courtwright . |
| 2,783,029 | 2/1957 | Fisher et al. ................... 256/19 |
| 3,306,586 | 2/1967 | Green .......................... 256/73 |
| 3,351,974 | 11/1967 | Wilhelmi ........................ 16/2 |
| 3,357,681 | 12/1967 | Souza, Jr. ...................... 256/65 |
| 3,372,441 | 3/1968 | Fisher ........................ 16/2 X |
| 3,462,126 | 8/1969 | Demanega ..................... 256/65 |
| 3,628,816 | 12/1971 | Ross, Jr. .................... 403/238 X |
| 3,707,276 | 12/1972 | Francis et al. .................. 256/24 |
| 3,822,053 | 7/1974 | Daily .......................... 256/22 |
| 3,858,850 | 1/1975 | Maxcy et al. ................... 256/22 |
| 3,921,960 | 11/1975 | Bright ......................... 256/65 |
| 4,050,831 | 9/1977 | DuBois ........................ 403/243 |
| 4,073,477 | 2/1978 | Walters ....................... 256/22 |
| 4,148,277 | 4/1979 | Engle et al. ................... 256/21 X |
| 4,149,701 | 4/1979 | Densen ........................ 256/65 |
| 4,299,363 | 11/1981 | Datschetski ................... 16/2 X |
| 4,352,587 | 10/1982 | Milz .......................... 403/252 |
| 4,403,767 | 9/1983 | Basey ......................... 256/67 X |
| 4,501,512 | 2/1985 | Hiltz ......................... 403/263 X |
| 4,600,179 | 7/1986 | Willetts ...................... 256/67 |
| 4,735,397 | 4/1988 | Degagne ....................... 403/263 X |

Primary Examiner—Andrew V. Kundrat
Assistant Examiner—Peter M. Cuomo
Attorney, Agent, or Firm—Fitch, Even, Tabin & Flannery

[57] ABSTRACT

A modular barrier comprising a pair of vertical posts, a pair of parallel rails and a holding assembly for retaining the ends of the rails inside the posts. Each of the posts has a facing vertical wall with the vertical wall having an upper window and a lower window. An upper tongue extends upwardly into the upper window while a dependent lower tongue extends into the lower window. Each of the rails has a first end disposed inside one of the posts and a second end disposed inside the other post. The posts have facing inside walls and each of the walls has an indentation adjacent the rails receiving a corresponding one of the tongues. The holding assembly is positioned entirely within a post and functions to push the rails towards each other so that the tongues are held in their corresponding indentations to maintain the posts and rails assembled.

17 Claims, 7 Drawing Sheets

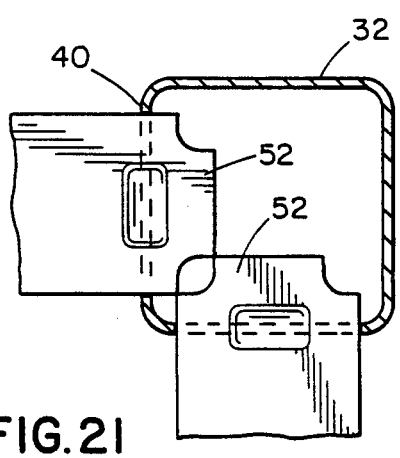
FIG.21
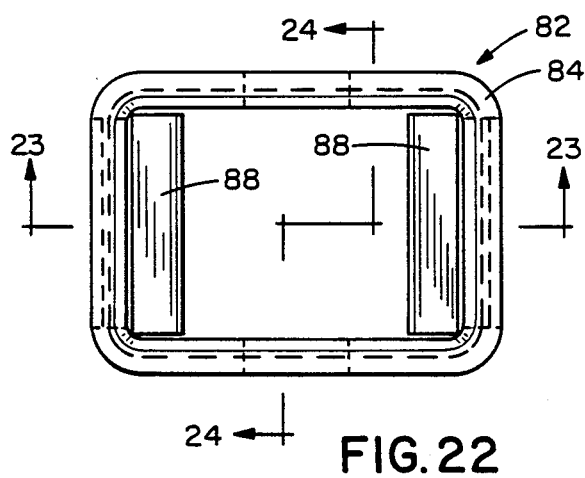
FIG.22
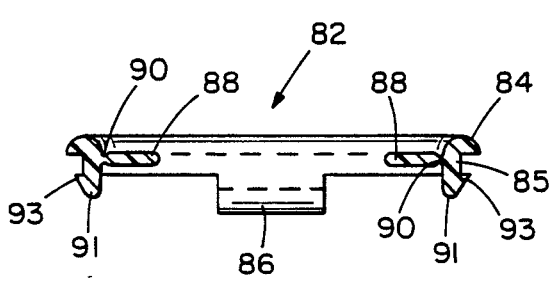
FIG.23
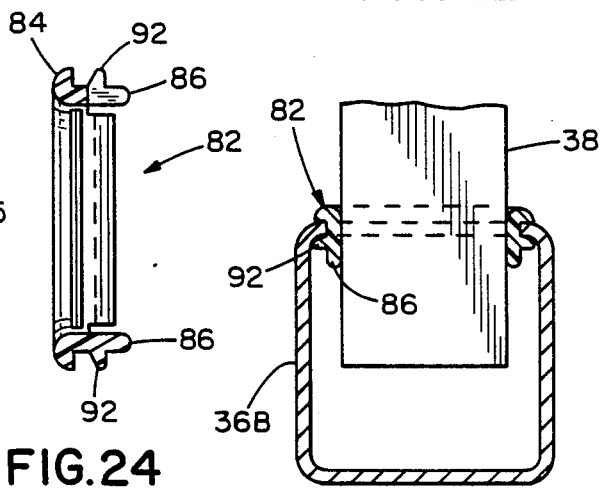
FIG.24
FIG.25
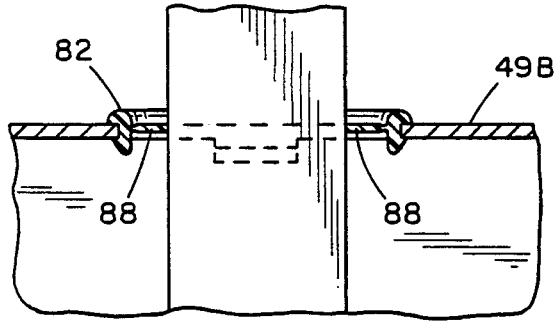
FIG.26
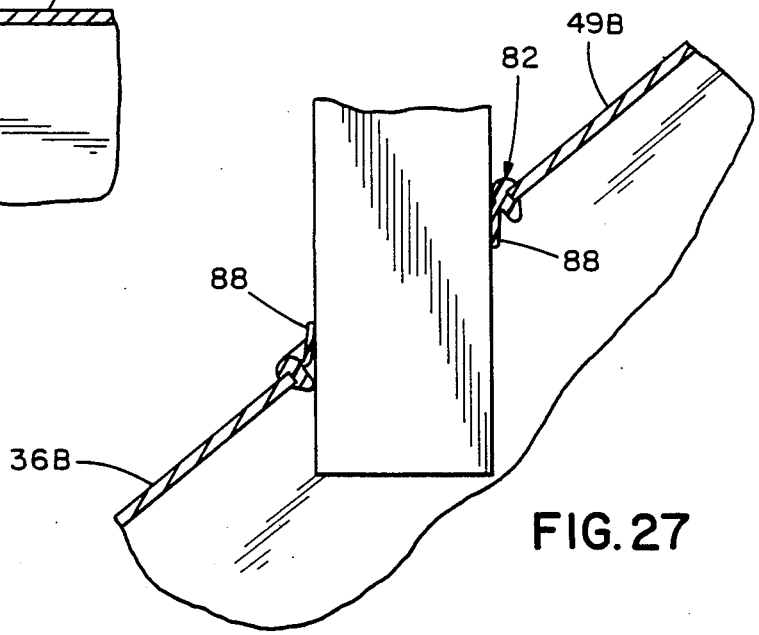
FIG.27

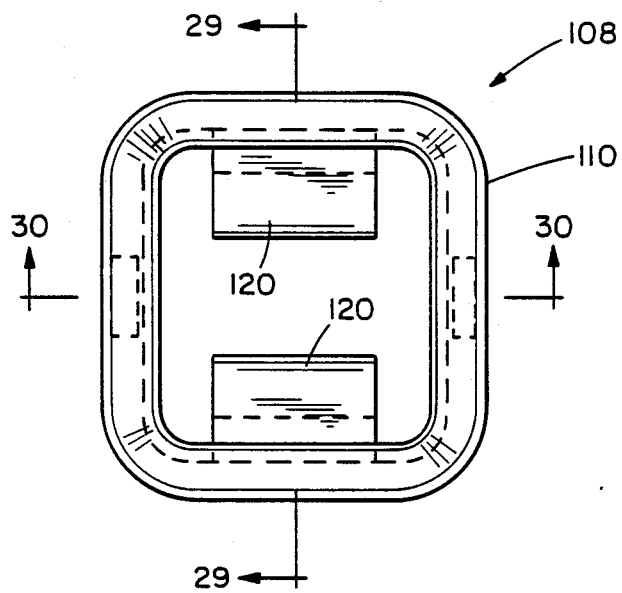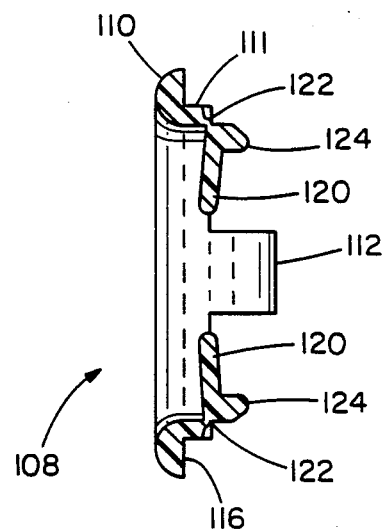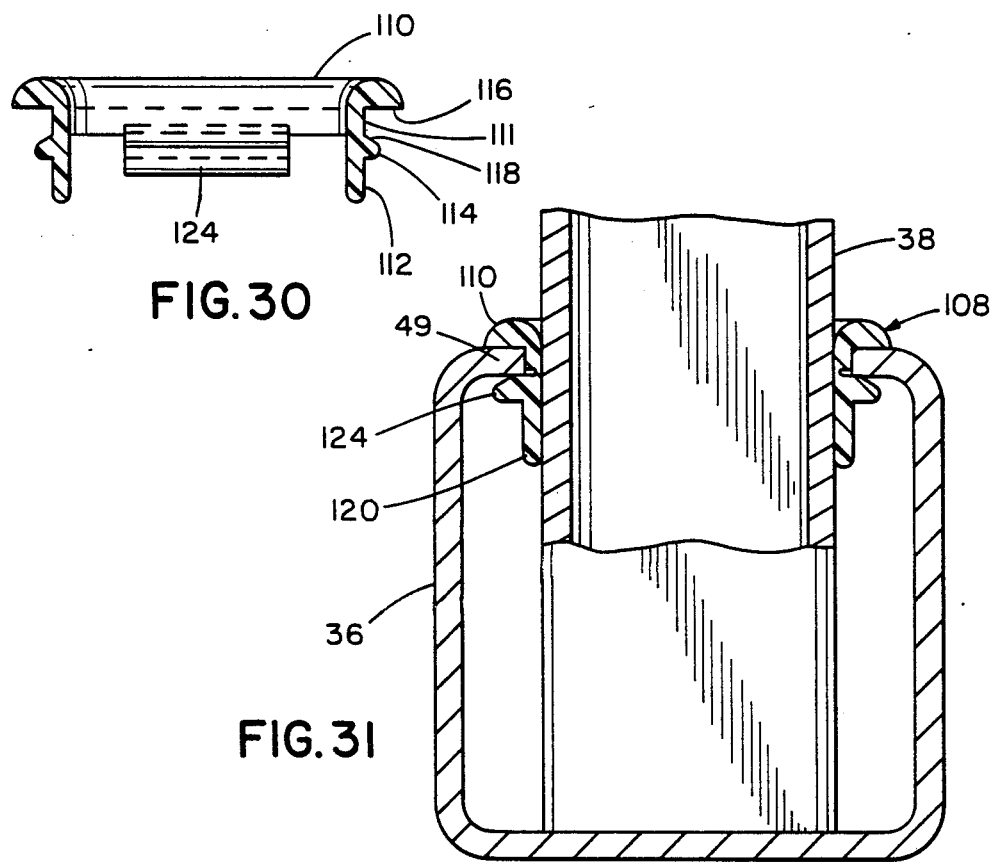
FIG. 28
FIG. 29
FIG. 30
FIG. 31

MODULAR BARRIER

The present invention relates to barriers and, more specifically, to an easily assembled module for forming a barrier, such as a fence or a balustrade, which can include both horizontal and inclined sections.

BACKGROUND OF THE INVENTION

Barriers, such as fences, balustrades and banisters, typically require labor intensive assembly and may require the use of several tools. Furthermore such barriers, when used outdoors, require extensive and frequent application of coating material. If not adequately protected, wood fences rot and steel barriers rust.

An example of such a barrier is a welded steel picket fence. After the vertical support posts are set, the upper and lower horizontal cross members or rails are installed. Next each individual picket or rung is attached by welding to the cross members. Care must be exercised in properly locating each picket and a coating for corrosion protection is applied after assembly is completed.

It is known in railing construction to provide for inclined sections by using pivoted connections incorporating pivot pins between the vertical rungs or posts and the inclined rails holding the rungs. These constructions typically require custom manufactured parts and their assembly is particularly labor intensive because of the installation of the pivot pins. For Further information regarding the structure and operation of such railing constructions, reference may be made to U.S. Pat. Nos. 1,416,957; 2,654,579; 3,306,586 and 3,707,276.

One proposed modular barrier incorporated inexpensive components, could be shipped in knockdown form, and can be assembled using only a screwdriver. This barrier includes a retainer loop inside a rail and which captures the end rung. The retainer is drawn toward the post by means of a screw, the head of which bears on an end plate. While this barrier performs satisfactorily for its intended purpose, it cannot conveniently be used for sharply inclined sections without bending of components of the barrier. For further information regarding the structure and operation of this barrier, reference may be made to commonly-assigned U.S. Pat. No. 4,600,179.

SUMMARY OF THE INVENTION

Among the several aspects and features of the subject invention may be noted the provision of an improved modular barrier. The barrier of the present invention permits formation of an inclined section, such as would serve as a stair railing, or a horizontal section using many common components and without bending any metallic component of the barrier. The barrier provides for reduced corrosion by providing seals covering cut metallic portions. The steel components are preferably galvanized with a polymide 11 nylon coating to further reduce corrosion. Furthermore, the barrier can be assembled quickly and easily using only a simple tool, such as a wrench. The components used in assembling the barrier are light in weight and can be shipped from the site of manufacture in knockdown form using simple packaging so that the components can conveniently be handled by the consumer. The modular barrier of the present invention is reliable in use, has long service life, and the components forming the barrier are easy and economical to manufacture. Other aspects and features of the present invention will be, in part, apparent and, in part, pointed out hereinafter in the following specification and in the accompanying claims and drawings.

Briefly, the modular barrier of the present invention includes a pair of spaced, vertical metallic tubular posts each having a facing vertical wall. Each of the vertical walls has an upper window and a lower window and there is an upper tongue extending upwardly into the upper window and a dependent lower tongue extending into the lower window. The barrier further includes an upper tubular metallic rail extending between the posts and a lower tubular metallic rail extending between the post with the rails being parallel and having facing inside walls and outside walls. Each of the rails has a first end disposed in one of the posts and a second end positioned inside the other of the posts and each of the facing inside walls is provided with an indentation adjacent the rail end for receiving a corresponding tongue. The barrier further includes a holding assembly for each post disposed entirely inside the post. The holding assembly functions to push the rails towards each other so that the tongues are held in their corresponding indentations to maintain the posts and the rails assembled.

BRIEF DESCRIPTION OF THE DRAWINGS

FIG. 21 is a simplified plan showing a post into which extend horizontal rails at a right angle;

FIGS. 22-24 are, respectively, a plan, a longitudinal cross-sectional view, and a transverse cross-sectional view, of a grommet for lining an aperture of an angled rail;

FIG. 25 is a sectional view of a lower horizontal rail depicting the locking arms of the grommet holding the inner wall of the rail;

FIG. 26 is a longitudinal sectional view of a part of a lower horizontal rail showing the position of facing sealing flaps;

FIG. 27 similar to FIG. 26, shows the positions of the sealing flaps due to their deflection by the rung when the lower rail is inclined;

FIGS. 28-30 are, respectively, a plan, a cross-sectional view taken generally along line 29—29 of FIG. 28, and a cross-sectional view taken generally along line 30—30 of FIG. 28, of a grommet for lining an aperture; and FIG. 31, similar to FIG. 25, is a sectional view of a horizontal rail depicting how the locking arms of the grommet of FIG. 28 are deflected to locking positions due to rung insertion.

Corresponding reference characters indicate corresponding components throughout the several views of the drawings.

DESCRIPTION OF THE PREFERRED EMBODIMENT

Figure 1:
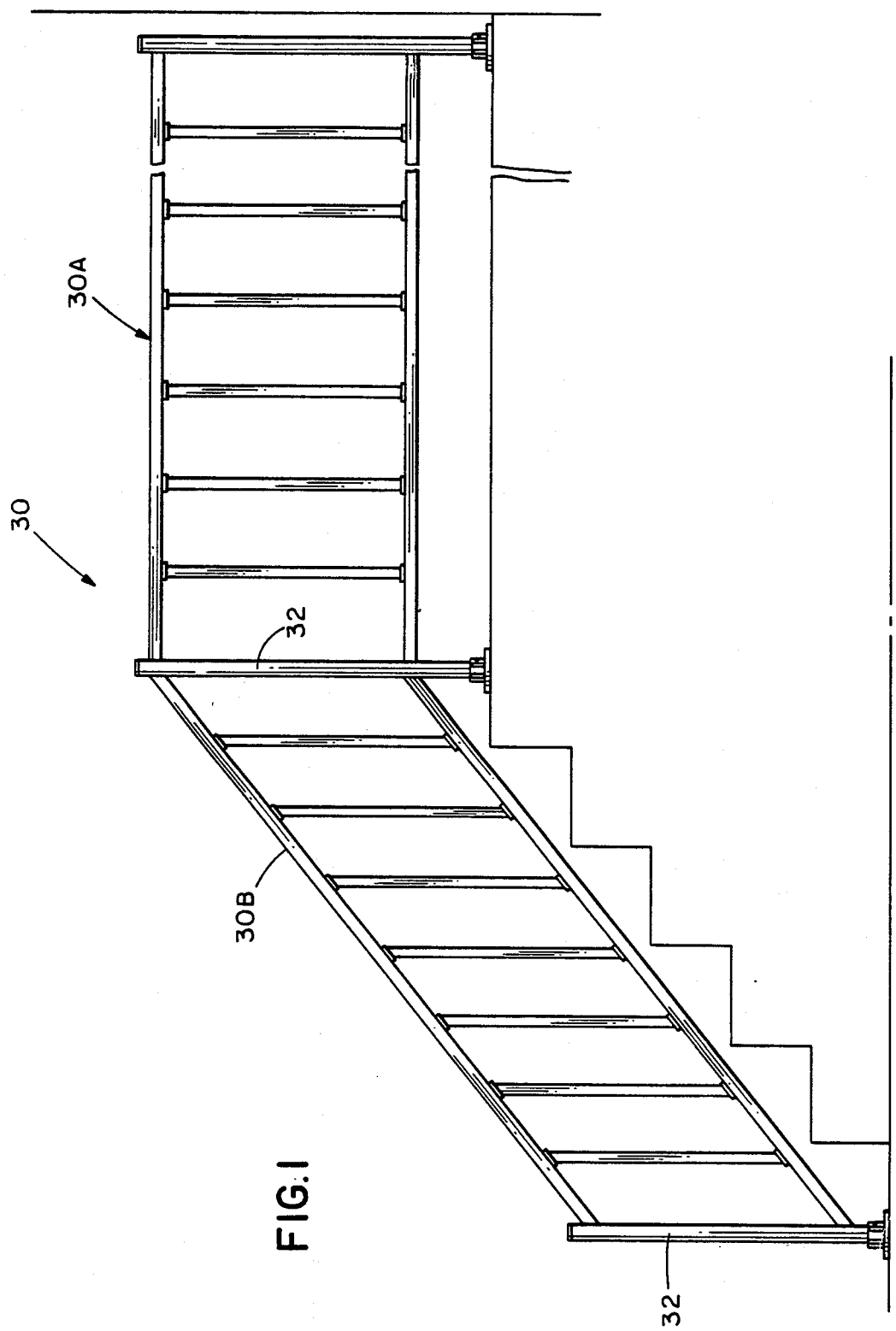
FIG. 1 is a side elevational view of a modular barrier, embodying various features of the present invention, including a horizontal section and an inclined section.
Figure 2:
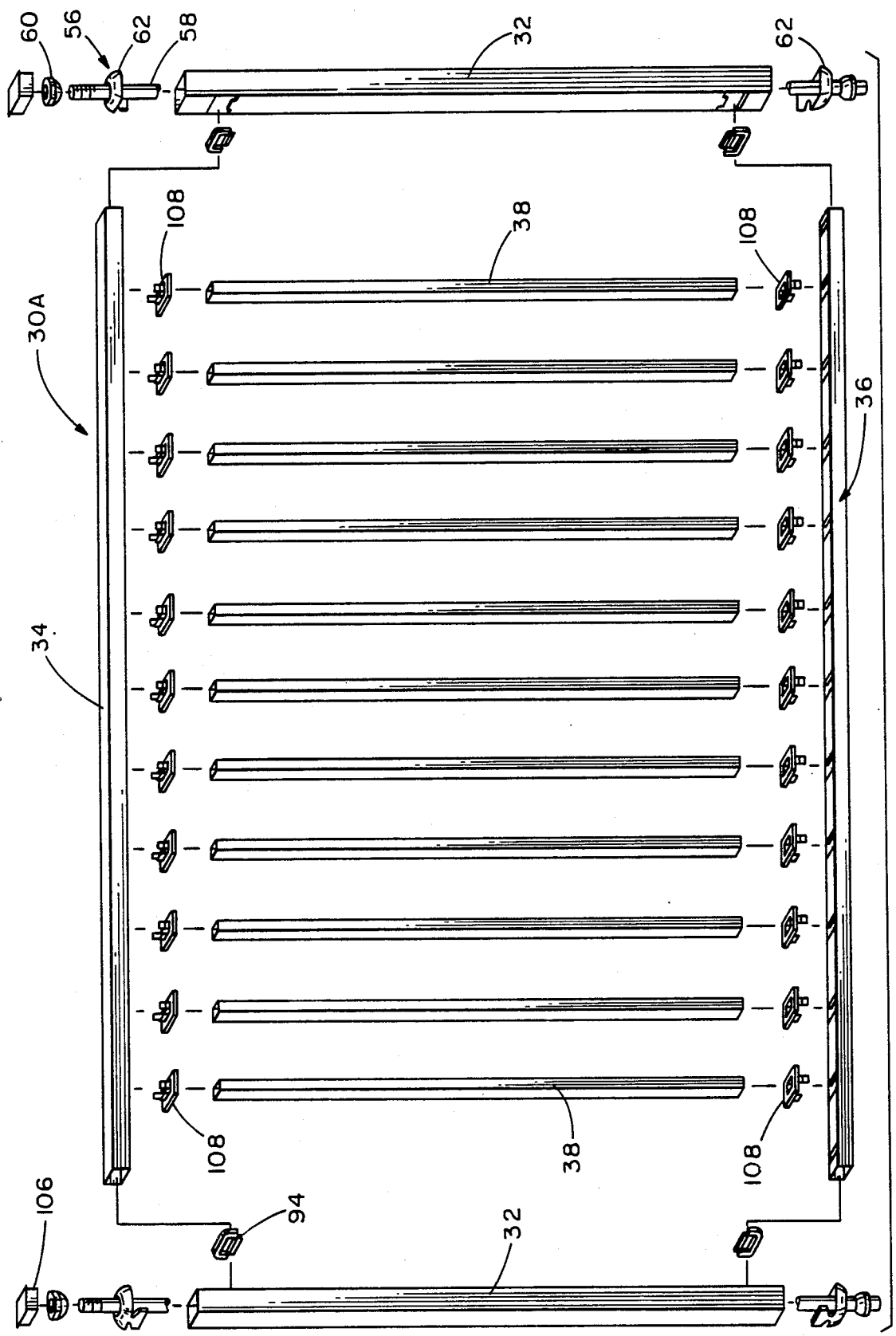
FIG. 2 is an exploded perspective view of the horizontal section of FIG. 1 including vertical posts and rungs, horizontal rails having apertures lined by grommets receiving the rungs, and various components of a holding assembly for retaining the rail ends inside the posts.

Referring now to the drawings, a modular barrier of the present invention is generally indicated in FIG. 1 by reference numeral 30. The barrier 30 can include one or more sections and is shown in FIG. 1 to include a horizontal section 30A and an inclined section 30B sharing a common post 32. The horizontal section 30A is best shown in FIG. 2 and includes a pair of spaced, vertical posts 32, a pair of parallel rails 34 and 36 extending between the posts, and a plurality of vertical rungs 38 held by the rails. The posts, rails and rungs, while of differing size, are all preferably of tubular galvanized steel construction. Also they have a protective coating such as nylon. It is known to produce on a continuous production line hot dipped galvanized tubing with a polymide 11 nylon coating electrostatically applied.

Figure 3:
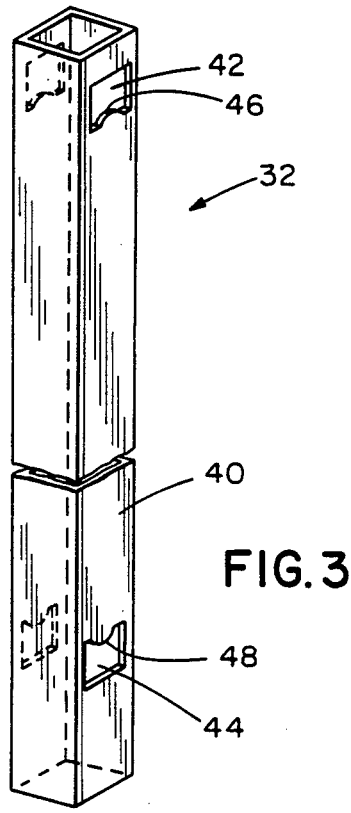
FIG. 3 is a perspective view of one of the posts of FIG. 1 illustrating windows for receiving the rail ends with a tongue extending into each window.
Figure 4:
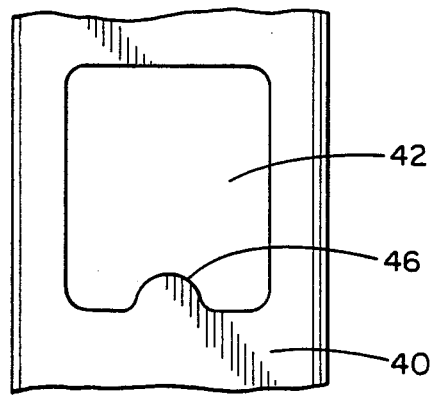
FIG. 4 is a fragmentary side elevational view showing the upper tongue.

More specifically, a post 32 (which is best shown in FIG. 3) is preferably square in transverse cross section and has a vertical wall 40 having an upper window 42 and a lower window 44. It will be appreciated that an end post has the windows in only one vertical wall. A line post, such as the one shared by horizontal section 30A and inclined section 30B, has the windows in opposite vertical walls. A corner post such as shown in FIG. 21 includes the windows in adjacent vertical walls. An arcuate upper tongue 46, best shown in FIG. 4, extends upwardly into upper window 42 while a lower tongue 48 extends into the lower window 44. Each window is of sufficient size to receive a corresponding rail without interference from a tongue.

Figure 7:
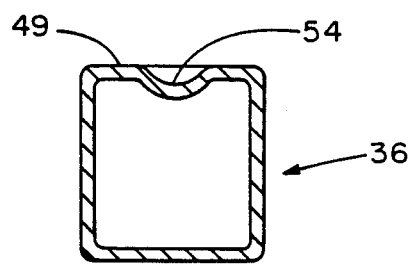
FIG. 7 is a sectional view of the rail of FIG. 5 taken generally along line 7—7 of FIG. 5.
Figure 5:
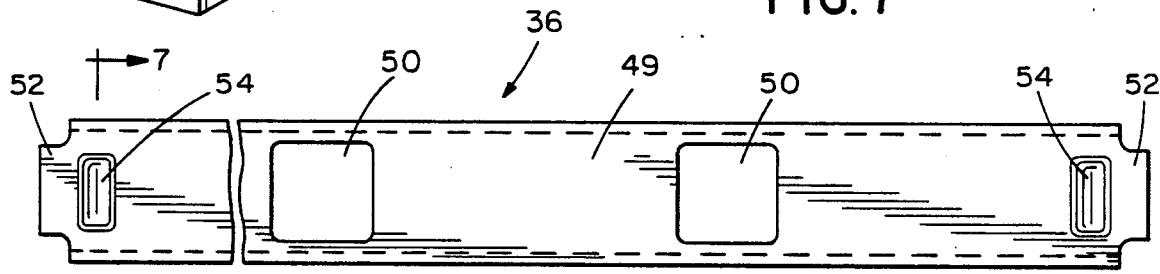
FIG. 5 is a plan of one of the horizontal rails.
Figure 6:
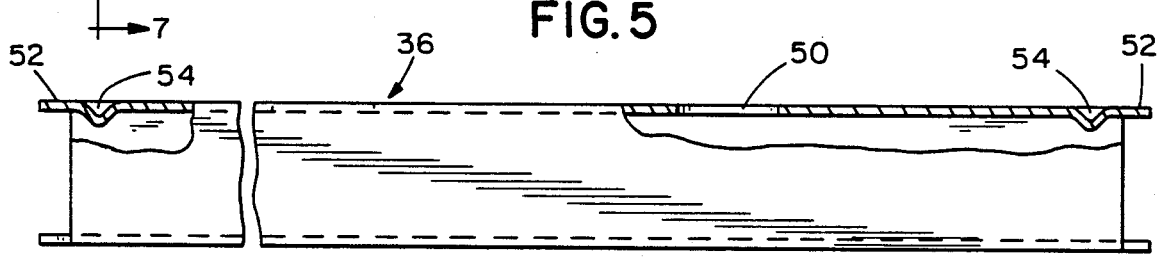
FIG. 6 is a side elevational view of the rail of FIG. 5 with certain components shown in section.
Figure 8:
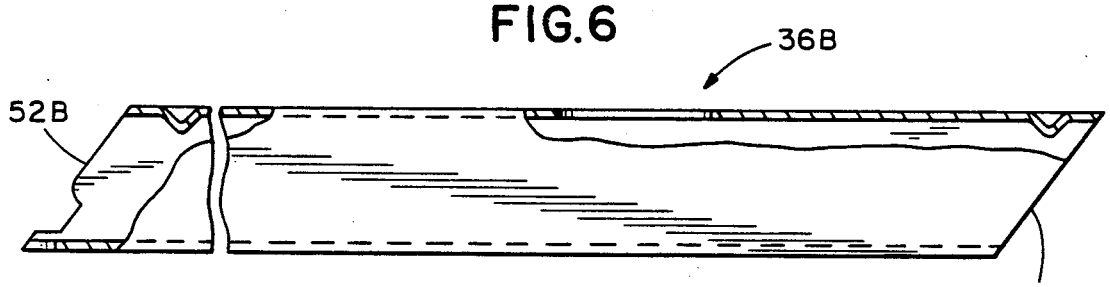
FIG. 8, similar to FIG. 6, is a side elevational view of one of the rails of the inclined section.

Referring to FIGS. 5-7, as the rails 34 and 36 are identical except for orientation, only the lower rail 36 need be discussed in detail. The lower rail 36 includes an inside wall 49 having a plurality of regularly spaced apertures 50 for receiving the ends of the rungs. The rail 36 has ends 52 which are preferably of reduced width and the inside wall has an indentation 54 adjacent each end but spaced therefrom a distance less than one-half the width of the post 32. The tongues are received by corresponding indentations and a pair of rail ends can be received at the same level by a line post or corner post. Each indentation is preferably longitudinally V-shaped, as shown in FIG. 6, and transversely arcuate, as shown in FIG. 7. A rail 36B for the inclined section 30B is similar to rail 30 except that the rail ends 52B are inclined and the windows 50B are rectangular instead of square.

Figures 12, 13, 14:
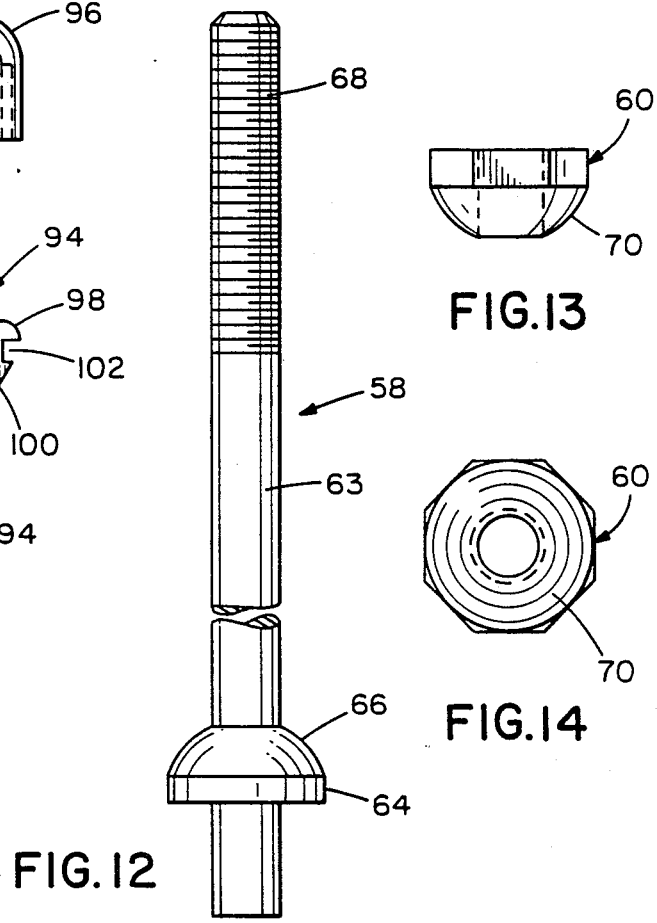
FIG. 12 is a front elevational view of a draw bolt which is part of the holding assembly.
FIGS. 13 and 14 are, respectively, a side elevational view and a bottom view of a hex nut having a convex bearing surface for threading onto the end of the draw bolt.
Figure 15:
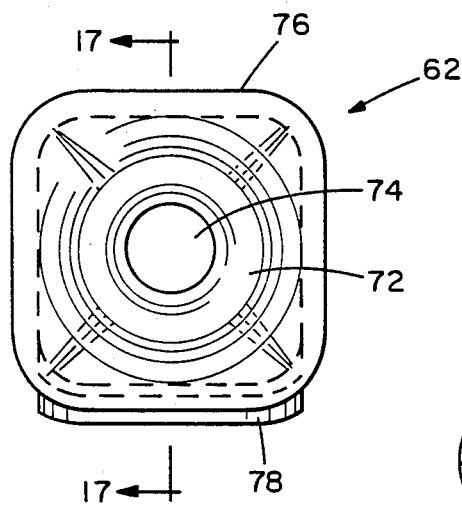
FIGS. 15-17 are, respectively, a plan, a side elevational view, and a sectional view taken generally along line 17—17 of FIG. 15, of one of a pair of identical draw cups of the holding assembly.
Figure 16:
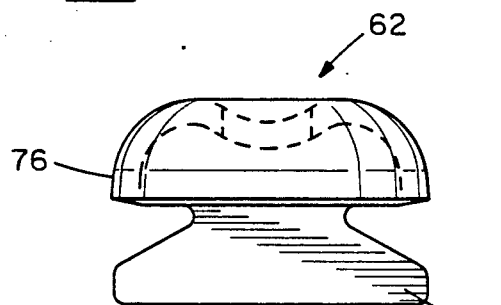
Figure 17:
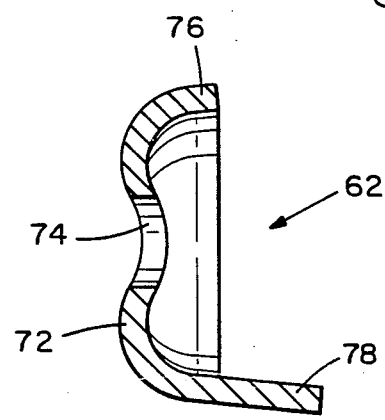

The ends of the upper rail 34 and lower rail 36 are held in the post 32 with the tongues in their corresponding indentations by a holding assembly 56 disposed entirely within the post. The assembly includes a draw bolt 58 shown in FIG. 12, a hex nut 60 depicted in FIGS. 13 and 14 and a pair of identical draw cups 62 which are best illustrated in FIGS. 15-17. The draw bolt includes a shaft 63 having at one end a head 64 with a convex engagement surface 66, and having at the other end a thread 68. The bolt could also be provided with an extension dependent from the head 64. It will be appreciated that the end of the outside wall of the inclined rail 36B could be provided with a slot for receiving the draw bolt shaft 63 in certain orientations of the rail. The nut 60 has a generally convex engagement surface 70 for bearing on the upper draw cup 62.

The draw cups 62 are preferably formed from a blank of cold rolled steel by stamping and swaging. Each draw cup is generally rectangular in plan and has a central concave portion 72 for bearing upon by engagement surface 66 or 70. The portion 72 defines a hole 74 of greater diameter than shaft 63 for receiving the shaft. Each draw cup further includes a peripheral skirt 76 and a dependent leg 78 extending from the skirt at one of the four sides.

Figure 18:
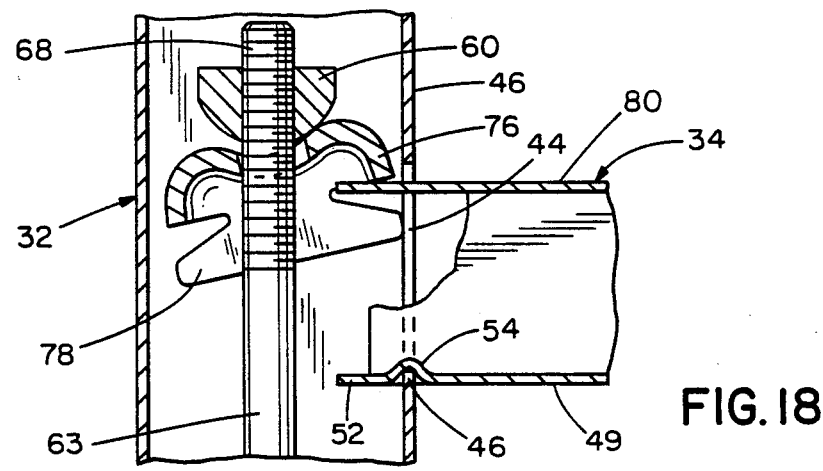
FIG. 18 is a simplified sectional view illustrating operation of the upper draw cup on a horizontal rail.
Figure 19:
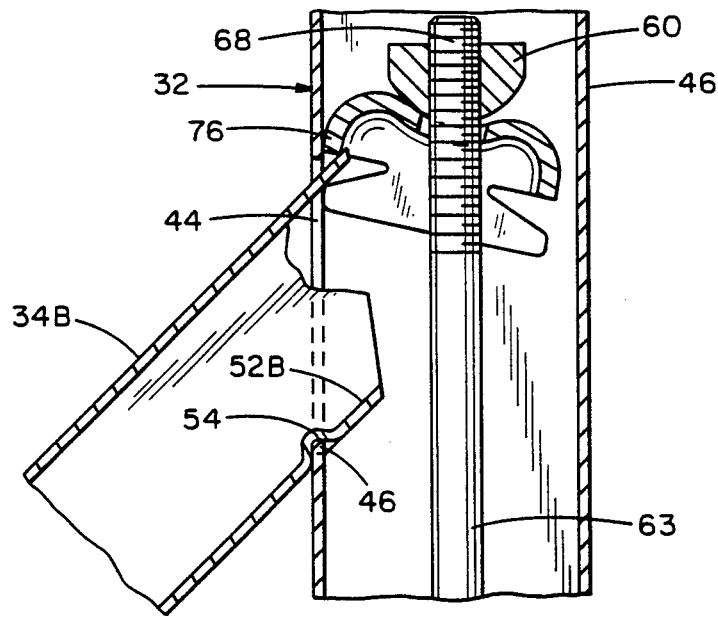
FIG. 19, similar to FIG. 18, shows operation of the upper draw cup on a downwardly inclined rail.
Figure 20:
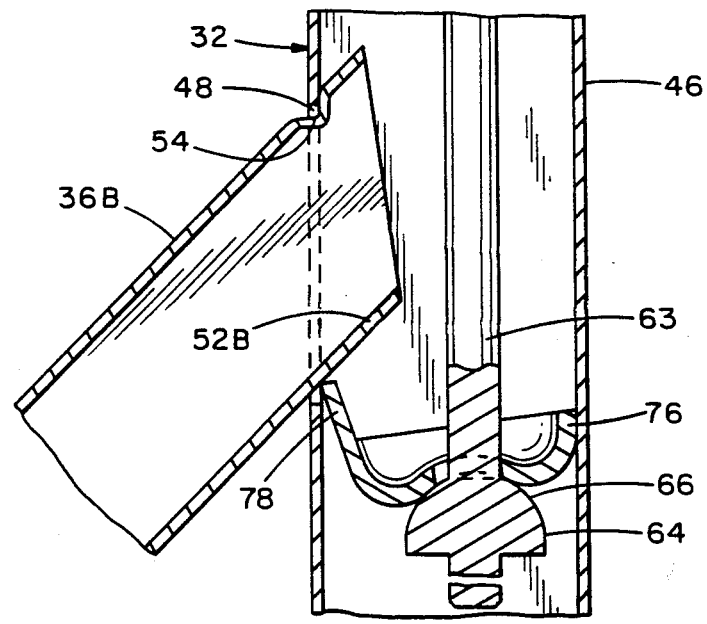
FIG. 20, also similar to FIG. 18, shows operation of the lower draw cup on a downwardly inclined rail.

FIGS. 18-20 illustrate the preferred orientation of the draw cups for the horizontal section 30A and the inclined section 30B in end posts. For the horizontal section shown in FIG. 18, the upper draw cup is arranged with the leg extending longitudinally so that the skirt 76 engages the outside wall 80 of the upper rail 34 and the leg 78 bears against the post vertical wall 40 defining the windows. It will be appreciated the downward force applied by the draw cup is in substantial alignment with the vertical wall 40 to reduce forces tending to bend the rail end 52.

FIG. 19 illustrates the upper draw cup bearing on the end 52B of upper rail 34B, while FIG. 20 shows the lower draw cup bearing on the end 52B of the lower rail 36B. While the orientation of the leg 78 of the upper draw cup 62 is as discussed above regarding the horizontal section, the leg 78 of the lower cup is arranged transversely to engage the outside wall of the rail end 52B. The skirt 76 of the lower draw cup bears on the vertical wall of the post opposite the vertical wall 40 having the windows. This orientation of the leg 78 which engages the upwardly inclined outside rail wall, provides a more stable arrangement and reduces the number of threads required on the end of the draw bolt 58. The orientation of the draw cup when used with line posts or corner posts is dependent upon the levels of the windows in the vertical walls and the angle of inclination of an inclined section 30B.

Referring to FIGS. 28-30, a sealing grommet 108 is illustrated for lining each of the generally rectangular apertures 50 of the inside wall of a horizontal rail 34 or 36. The apertures 50 are somewhat larger than the rungs 38. Each grommet 108 is preferably of one-piece thermoplastic molded construction (a preferred material being Hytrel 4056, a registered trademark of DuPont for polyester elastomer) and includes a peripheral abutment rim 110 for limiting insertion of the grommet through a rail inside wall 49 with a skirt 111 dependent from the rim for extending through the aperture. A pair of spaced dependent legs 112 is provided extending downwardly from the skirt for guiding the grommet into the rail, and each has an outwardly extending nose 114 for extending beneath the material of the inner wall defining the aperture to retain the grommet in the rail. The rim has a horizontal bottom surface 116 while each nose has an inclined top surface 118 with the minimum spacing between the two surfaces being less than the inner wall thickness so that the inner wall is compressively held between the rim 110 and the nose 114.

Grommet 108 further includes a pair of spaced deflectable arms 120 extending inwardly from the base of the skirt 111 and connected thereto at the inside corner by a neck 122 of reduced thickness compared to other components of the grommet. The spacing between the distal ends of the arms is insufficient to permit passage of the rung without substantial interference, and each arm has a dependent locking nose 124 for insertion through the aperture. Insertion of the rung 38 through the grommet 108 seated in the aperture causes outward deflection of the arms 120 resulting in the noses 124 moving beneath material of the inside wall 49 forming the aperture 50 to lock the grommet 108 in position, as shown in FIG. 31.

Referring to FIGS. 22–26, a sealing grommet 82 is shown which is employed for each rung-receiving aperture 50B in the inner walls of the inclined rails 34B and 36B. The apertures 50B are generally rectangular and are somewhat larger than the rungs 38. Each grommet 82 is preferably of one-piece thermoplastic molded construction and made of the same material as grommets 108. Each includes a peripheral abutment rim 84 for limiting insertion of the grommet through a rail inside wall 49B with a skirt 85 extending downwardly therefrom, a pair of spaced dependent legs 86 for guiding the grommet into the rail, and a pair of inwardly directed flaps 88 extending from the skirt 85, intermediate the legs 86, and connected to the skirt by necks 90 of reduced thickness compared to other components of grommet 82. The spacing between the distal ends of the flaps is sufficient to permit passage of the rung without substantial interference. Each leg 86 has an outwardly extending locking nose 92, and the skirt 85 at the locations of the flaps 88 may be provided with dependent guiding legs 91 with locking noses 93.

FIG. 26 shows the flaps when the rung 38 is initially inserted at a right angle to the rail. FIG. 27 illustrates the position of the flaps 88 when the rail is inclined and the rung vertical. This is the orientation of the flaps for an inclined section 30B. While the rung 38 is inserted perpendicular to the railing, after insertion the rung is moved to the proper inclination which causes one of the flaps 88 to be deflected downwardly and the other flap to be deflected upwardly, to again limit access of water to the inside of the rail.

Figure 9:
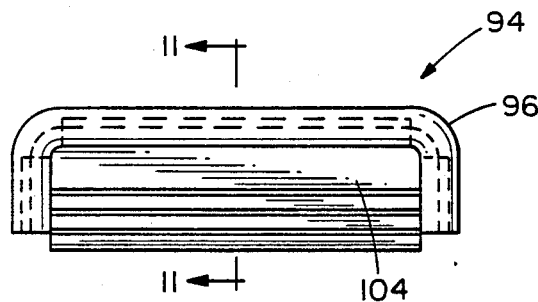
FIGS. 9-11 are, a front elevational view, a bottom view, and a sectional view taken generally along line 11—11 of FIG. 9, of a plug for closing the portion of a post window not occupied by a rail end.
Figure 10:
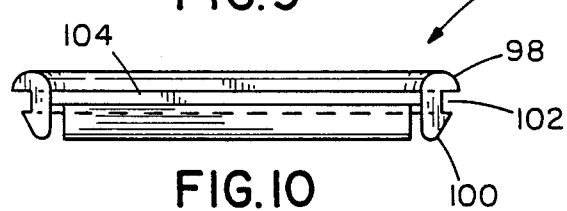
Figure 11:
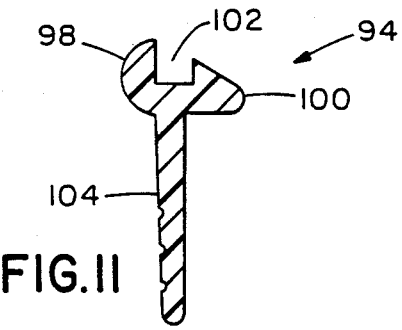

A plug 94 is illustrated in FIGS. 9–11, for closing the portion of a window 42 or 44 not occupied by its associated rail when the holding means 56 maintains the rails so that the tongues are received in the indentations. The plug 94 includes a peripheral rim 96 having an abutment 98 for limiting movement of the plug into the window. It further includes a nose 100 for guiding the plug into the window with the nose and abutment defining a channel 102 for reception of material of the vertical wall defining the window. Dependent from these components is a flap 104 for closing the window to limit access of moisture to the post interior. As shown in FIG. 2, caps 106 are also provided for closing the tops of the posts. The plugs 94 and the caps 106 are again preferably of molded thermoplastic construction with a preferred material being polymide 11.

Assembly of the modular barrier 30 of the present invention is as follows. For a horizontal section 30A, one of the grommets 108 is seated in each of the rung apertures 50. The rungs 38 are then inserted through the grommets 108 seated in one of the rails and then the other ends of the rungs are moved into the grommets 108 held in the apertures of the other rail. The assembly of the rails and rungs are then moved into association with a post 32 which has been located. The located post could either have a mounting foot attached to its lower end (as shown in FIG. 1) or, for example, be fixed in concrete. Mounting feet are well known to those of skill in the art and need not be further discussed here.

Draw rod bolt 58 with the lower draw cup 62 oriented as discussed above is disposed in the fixed post. The rails are then inserted through their corresponding windows so that the tongues and indentations are properly aligned. The upper draw cup is properly oriented and the hex nut 60 is threaded onto the upper threaded end 68 of the draw bolt by finger pressure to loosely hold the rail/rung assembly to the fixed post 32. The other post 32 is then brought to the other end of the rails and the rail ends are inserted through the windows of that post. After the location of the post has been fixed, the upper draw cup 62 is properly oriented and the hex nut 60 tightened, either by finger pressure or lightly with a wrench (so as not to cause bending of any metal). The other nut is appropriately tightened and the plugs 94 and caps 106 are seated to close the openings in the posts. It will be appreciated that the assembly is extremely convenient and can be accomplished with either no tools or the use of only a simple tool such as a wrench. Assembly of an inclined section 30B is similar except inclined rails 34B and 36B are used along with the grommets 82.

The modular barrier of the present invention permits orientation of the rails with respect to the posts 32 from horizontal to about 45 degree inclination without bending of the metallic components and employing substantially the same components, except for the rails and the aperture grommets. As shown in FIGS. 18–20, the tongue 46 of the post wall is seated at the apex of the rail indentation when the rail is horizontal, but the tongue is seated against one of the legs forming the V-shaped indentation when the rail is inclined (as shown in FIG. 19). The draw cup 62 is able to be selectively oriented to hold the rail depending on its inclination. As the draw cup hole 74 is oversized with respect to the shaft 63 of the draw bolt 58, the cup can assume a variety of positions with respect to the bolt.

The rung grommet 82 can also accommodate a variety of rail inclinations while functioning to block the access of water to the rails. The only cut portions (ends, windows and rung apertures) of the nylon coated metallic tubular members are covered y the caps, grommets and plugs, respectively, to limit corrosion.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A modular barrier comprising:

a pair of spaced, vertical metallic tubular posts each having a facing vertical wall, each said vertical wall having an upper window and a lower window, each said vertical wall further including an upper tongue extending upwardly into said upper window and a dependent lower tongue extending into said lower window;

an upper tubular metallic rail extending between said posts;

a lower tubular metallic rail extending between said posts with said rails being parallel and having facing inside walls and outside walls, each said rail having a first end disposed inside one of said posts and a second end disposed inside the other of said posts, each of said facing inside walls having an indentation adjacent each said end receiving a corresponding one of the tongues, each of said windows being sized to receive its corresponding rail ends; and holding means pushing said rails towards each other and disposed inside each of said posts, each of said holding means engaging said outside walls of said rails and pushing each of said rails toward the other of said rails whereby said tongues are held in their corresponding indentations to maintain said posts and said rails assembled, and the rails are moved toward each other by the holding means so that said rails are firmly secured, said rail ends extending less than halfway through said costs, each of said holding means being disposed entirely within its corresponding post.

2. A barrier as set forth in claim 1 wherein said rails are substantially horizontal.

3. A barrier as set forth in claim 1 wherein said rails are inclined.

4. A barrier as set forth in claim 1 wherein each of said inside walls have a plurality of regularly spaced apertures therealong with respective apertures in each inside wall being vertically aligned and forming pairs, said barrier further including a plurality of spaced metallic rungs extending between said rails with each rung having end portions received by a respective pair of apertures in said inside walls so that rung end portions extend inside the respective tubular rails.

5. A barrier as set forth in claim 4 further comprising a grommet of resilient molded thermoplastic material lining each of said apertures.

6. A barrier as set forth in claim 5 wherein said grommet is formed of a polyester elastomer.

7. A barrier as set forth in claim 5 wherein said rails are substantially horizontal and wherein each aperture is larger than the rung received by it, said grommet in its as-formed condition including an abutment rim for limiting insertion of said grommet through the aperture, a pair of spaced dependent legs for guiding the grommet into the rail, and a pair of spaced deflectable arms extending inwardly from adjacent the rim intermediate said legs with the spacing between the distal ends of said arms being insufficient to permit passage of the rung without substantial interference, each arm having a dependent locking nose for insertion through the aperture spaced from the arm distal end, whereby insertion of the rung through the grommet seated in said aperture causes outward deflection of said arms resulting in said noses moving beneath material of the inside wall forming the aperture to lock said grommet in position.

8. A barrier as set forth in claim 7 wherein said arms are connected to said rim by necks of reduced thickness relative to other components of said rim and said arms.

9. A barrier as set forth in claim 5 wherein said rails are inclined and wherein each aperture is larger than the rung received by it, said grommet in its as-formed condition including an abutment rim for limiting insertion of said grommet through the aperture, a pair of spaced dependent legs for guiding the grommet into the rail, and a pair of inwardly directed flaps extending from adjacent said rim and intermediate said legs with the spacing between the distal ends of said flaps being sufficient to permit passage of the rung without substantial interference from said flaps, inclination of said rung with respect to said rail causing one of said flaps to be deflected upwardly and the other of said flaps to be deflected downwardly with respect to said rail.

10. A barrier as set forth in claim 9 wherein said flaps are connected to said rim by necks of reduced thickness.

11. A barrier as set forth in claim 4 wherein said posts, said rails and said rungs are formed of hot dipped galvanized tubing coated with nylon.

12. A modular barrier comprising:

a pair of spaced, vertical metallic tubular posts each having a facing vertical wall, each said vertical wall having an upper window and a lower window, each said vertical wall further including an upper tongue extending upwardly into said upper window and a dependent lower tongue extending into said lower window;

an upper tubular metallic rail extending between said posts;

a lower tubular metallic rail extending between said posts with said rails being parallel and having facing inside walls and outside walls, each said rail having a first end disposed inside one of said posts and a second end disposed inside the other of said posts, each of said facing inside walls having an indentation adjacent each said end receiving a corresponding one of the tongues, each of said windows being sized to receive its corresponding rail end; and holding means disposed inside each of said posts pushing said rails towards each other whereby said tongues are held in their corresponding indentations to maintain said posts and said rails assembled, said rail ends extending less than halfway through said posts, each of said holding means being disposed entirely within its corresponding post and comprising:

a lower draw cup bearing on the outside wall of said lower rail;

an upper draw cup bearing on the outside wall of said upper rail, each of said draw cups having a central hole; and a draw bolt extending through the holes in said cups, said bolt having a head engaging said lower cup and a threaded upper end, said holding means further comprising a nut threaded onto said upper end and bearing on said upper draw cup.

13. A barrier as set forth in claim 12 said upper and lower draw cups are identical, each said draw cup being of integral metallic construction and generally rectangular in plan and comprising a central concave portion defining said hole, a peripheral skirt and a dependent leg extending from the skirt at one side.

14. A barrier as set forth in claim 13 wherein said rails are substantially horizontal and said posts have a generally rectangular cross section, the skirt of each draw cup engaging its associated rail and the leg of each draw cup bearing on the vertical wall of the post defining said windows.

15. A barrier as set forth in claim 13 wherein said rails are inclined and extend downwardly from one of said posts which has a generally rectangular cross section, the skirt of said upper draw cup engaging said upper rail with the leg of that draw cup bearing on the vertical wall of said one post defining said windows, the leg of said lower draw cup engaging said lower rail with the skirt of that draw cup bearing on a wall of said one post opposite said vertical wall defining said windows.

16. A barrier as set forth in claim 13 wherein said head has a generally convex surface engaging said lower draw cup.

17. A barrier as set forth in claim 13 wherein said nut has a generally convex surface engaging said upper draw cup.

* * * * *

UNITED STATES PATENT AND TRADEMARK OFFICE
CERTIFICATE OF CORRECTION

PATENT NO.   :   4,898,365
DATED        :   February 6, 1990
INVENTOR(S)  :   John P. Conner et al.

It is certified that error appears in the above-identified patent and that said Letters Patent is hereby corrected as shown below:

Column 1, lines 30-31, after "For" delete paragraph and then change "Further" to --further--.

Column 2, line 49, after "are," insert --respectively,--.

Column 6, line 62, change "y" to --by--.

Column 7, line 33, change "costs" to --posts--.

Column 8, line 63, after "12" insert --wherein--.

Signed and Sealed this

Fifth Day of February, 1991

*Attest:*

HARRY F. MANBECK, JR.

*Attesting Officer*    *Commissioner of Patents and Trademarks*